United States Patent Office 3,637,764
Patented Jan. 25, 1972

3,637,764
α-NITROEPOXIDES AND METHOD OF PREPARING SAME
Howard Newman, Monsey, and Robert Bruce Angier, Pearl River, N.Y., assignors to American Cyanamid Company, Stamford, Conn.
No Drawing. Filed Feb. 24, 1969, Ser. No. 801,802
Int. Cl. C07d 1/00, 1/06
U.S. Cl. 260—348
1 Claim

ABSTRACT OF THE DISCLOSURE

This disclosure describes compounds of the class of α-nitroepoxides useful as chemical intermediates and antifungal agents.

BRIEF SUMMARY OF THE INVENTION

This invention relates to new organic compounds and, more particularly, is concerned with novel 1,2-disubstituted-2-nitroethylene oxides and with a novel method of preparing these compounds. The novel compounds of the present invention may be represented by the following general formula:

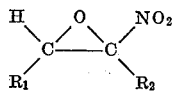

wherein $R_1$ is phenyl or cyclohexyl and $R_2$ is phenyl or lower alkyl. Suitable lower alkyl groups contemplated by the present invention are those having from 1 to 4 carbon atom such as, for example, methyl, ethyl, isopropyl, n-butyl, isobutyl, etc. Typical compounds of the present invention represented by the above general formula are, for example, 1,2-diphenyl-2-nitroethylene oxide, 1-phenyl-2-ethyl-2-nitroethylene oxide, 1-phenyl-2-methyl-2-nitroethylene oxide, 1-phenyl-2-n-propyl-2-nitroethylene oxide, 1-cyclohexyl-2-phenyl-2-nitroethylene oxide, 1-cyclohexyl-2-isopropyl-2-nitroethylene oxide, 1-cyclohexyl-2-methyl-2-nitroethylene oxide and 1-cyclohexyl-2-isobutyl-2-nitroethylene oxide.

DETAILED DESCRIPTION OF THE INVENTION

The novel compounds of the present invention are generally obtainable as either liquids or crystalline materials having characteristic boiling points or melting points and absorption spectra. The liquid products may be purified by vacuum distillation and the solid products may be purified by recrystallization from common organic solvents such as methanol. They are appreciably soluble in many organic solvents such as acetone, chloroform, diethyl ether, dimethylformamide, and the like but are relatively insoluble in water.

The novel 1,2-disubstituted-2-nitroethylene oxides of the present invention may be readily prepared from an appropriately substituted nitro olefin as illustrated in the following reaction scheme:

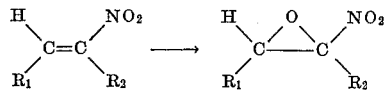

wherein $R_1$ and $R_2$ are as hereinabove defined. In acccordance with the above reaction scheme, an appropriately substituted nitro olefin is treated with hydrogen peroxide (about 10–20% aqueous) and dilute sodium hydroxide (about 2 N–3 N) in methanolic solution at a temperature of about 0°–15° C. for a period of time of about 5–15 minutes. The reaction mixture may then be poured onto ice, acidified, and the product extracted into diethyl ether. The product may then be isolated and purified by conventional procedures well known in the art and as herein-above set forth. The nitro olefin starting materials may be readily obtained by the procedures described by Gairaud et al., J. Org. Chem. 18, 1 (1953), Robertson, J. Org. Chem. 25, 47 (1960), and Shechter et al., J.A.C.S. 78, 4984 (1956).

The novel compounds of the present invention are useful as intermediates in the preparation of other organic compounds as illustrated in the following reaction scheme:

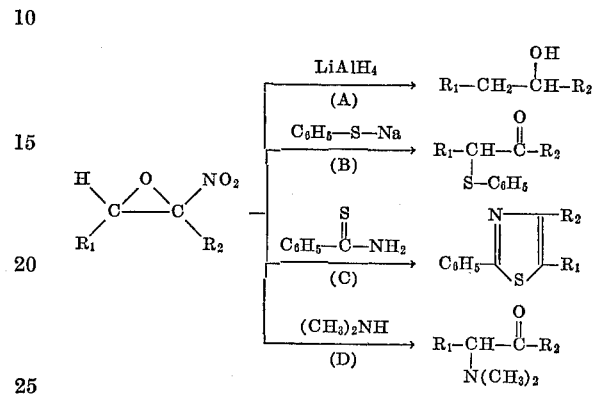

An exemplification of reaction (A) is the reduction of 1-phenyl-2-methyl-2-nitroethylene oxide with an excess of lithium aluminum hydride in diethyl ether at room temperature for one hour to give 1-phenyl-2-propanol in high yield. Illustrative of reaction (B) is the reaction of sodium thiophenolate with 1-phenyl-2-methyl - 2 - nitroethylene oxide in methanol at room temperature for 3 hours to give 1-phenyl-1-thiophenyl-2-propanone. M.P. 64°–66° C. An instance of reaction (C) is the interaction of 1-phenyl-2-methyl-2-nitroethylene oxide and thiobenzamide in refluxing methanol for 16 hours to give 2,5-diphenyl-4-methyl-thiazole, M.P. 50.5°–53.5° C. Typical of reaction (D) is the treatment of 1-phenyl-2-methyl-2-nitroethylene oxide with dimethylamine in methanol at room temperature for 3 hours to give 1-phenyl-1-dimethylamino-2-propanone, isolated as the hydrochloride salt, M.P. 194°–201° C.

The compound 1,2-diphenyl-2-nitroethylene oxide is an antifungal agent and possesses broad-spectrum antifungal activity in vitro against a variety of standard laboratory microorganisms as determined by the agar-dilution streak-plate technique. In this assay, the compounds to be tested are made up to contain 2.5 mg. of test compound per milliliter of solution. Observing sterile techniques, two-fold serial dilutions are made of each test solution. One milliliter of each of the original solutions and of each of the serial dilutions is then added to 9 ml. of warm sterile nutrient agar capable of supporting growth of the fungal test cultures. The standard sterile nutrient agar solutions containing the different dilutions of the test compounds, along with suitable and comparable control dilutions containing no test compound, are then allowed to cool in petri dishes thereby forming solidified agar plates. The test yeast-like fungi are prepared for use by growing in broth overnight. The spores of the filamentous fungi are harvested from mature agar slant cultures and are suspended in sterile physiological saline solution. A loopful of each of the resulting live suspensions is then, still employing sterile techniques, streaked upon the surfaces of each of the agar plates and the resulting streaked plates are then incubated. After an appropriate period of time, each of the streaks on each of the plates is inspected visually and the extent, if any, of fungal growth is noted. Appropriate calibration of these observations permits the quantitative calculation of the minimal inhibitory concentration (expressed in micrograms per milliliter) causing complete inhibition of growth for each test compound.

The minimal inhibitory concentration of 1,2-diphenyl-2-nitroethylene oxide against various test organisms as determined in the above-described assay are set forth in Table I below:

TABLE I

| Fungal culture: | Minimal inhibitory conc. mcg./ml. |
|---|---|
| Candida albicans E 83 | 100 |
| Cryptococcus neoformans E 138 | 50 |
| Microsporum canis ATCC 10214 | 10 |
| Microsporum gypseum ATCC 14683 | 25 |
| Trichophyton tonsurans NIH 662 | 25 |
| Trichophyton mentagrophytes E 11 | 25 |
| Trichophyton rubrum E 97 | 25 |

The invention will be described in greater detail in conjunction with the following specific examples.

EXAMPLE 1

Preparation of 1-phenyl-2-methyl-2-nitroethylene oxide

A 2.5 milliliter (0.005 mole) portion of 2 N NaOH was added rapidly to a stirred, cooled suspension of 1.6 grams (0.01 mole) of β-methyl-β-nitrostyrene and 4.5 milliliters (0.015 mole) of 15% hydrogen peroxide in 25 milliliters of absolute methanol. The reaction mixture was stirred in an ice-water cooling bath for 10 minutes and then poured onto ice. This basic mixture was acidified with cold dilute HCl and extracted into diethyl ether. The ethereal extracts were washed with aqueous sodium sulfite, water and sodium bicarbonate, evaporated and dried to yield 1.56 grams of the product as a light yellow liquid, boiling point 77°–78° C. (0.1 mm.).

EXAMPLE 2

Preparation of 1,2-diphenyl-2-nitroethylene oxide

A 10 milliliter portion of 2 N NaOH was added, all at once, with stirring, to an ice-water cooled mixture of 9 grams (0.04 mole) of α-nitrostilbene and 18 milliliters of 15% hydrogen peroxide in 100 milliliters of methanol. The mixture was stirred in the ice-water cooling bath for about 5 minutes and was then allowed to come to room temperature with stirring during 10 minutes. Ice was added and the colorless solid was separated by filtration, washed with water and dried. The product melted at 108°–110° C. after recrystallization from methanol.

EXAMPLE 3

Preparation of 1-cyclohexyl-2-methyl-2-nitroethylene oxide

By following essentially the procedure of Example 2; 1-cyclohexyl-2-methyl-2-nitroethylene oxide, a colorless liquid, boiling point 68°–71° C. (0.1 mm.), was prepared from 1-cyclohexyl-2-nitro-1-propene.

We claim:
1. 1,2-diphenyl-2-nitroethylene oxide.

References Cited

UNITED STATES PATENTS 3,183,250   5/1965   Rosenblatt et al. _____ 260—348

OTHER REFERENCES

Weissberger, Heterocyclic Compounds With Three- and Four-Membered Rings, Part One (1964) pp. 57–8.

NORMA S. MILESTONE, Primary Examiner

U.S. Cl. X.R.

260—302 R, 590, 618 R, 618 H; 424—278